(12) United States Patent
Huang et al.

(10) Patent No.: US 7,545,442 B2
(45) Date of Patent: Jun. 9, 2009

(54) Y/C SEPARATION WITH 3D COMB FILTER

(75) Inventors: Yuan-Hao Huang, Hsinchu (TW); Jen-Yao Ho, Hsinchu (TW)

(73) Assignee: VXIS Technology Corp., Hsinchu (TW)

( * ) Notice: Subject to any disclaimer, the term of this patent is extended or adjusted under 35 U.S.C. 154(b) by 753 days.

(21) Appl. No.: 11/298,483

(22) Filed: Dec. 12, 2005

(65) Prior Publication Data

US 2006/0125967 A1 Jun. 15, 2006

(30) Foreign Application Priority Data

Dec. 14, 2004 (TW) ............................. 93138668 A

(51) Int. Cl.
*H04N 5/00* (2006.01)
(52) U.S. Cl. ............... 348/663; 348/609; 348/665; 348/667; 348/668; 348/670
(58) Field of Classification Search ........... 348/609, 348/663, 665–670; 386/25
See application file for complete search history.

(56) References Cited

U.S. PATENT DOCUMENTS

| | | | | |
|---|---|---|---|---|
| 5,473,389 A | * | 12/1995 | Eto et al. | 348/669 |
| 5,909,255 A | * | 6/1999 | Hatano | 348/663 |
| 5,929,938 A | * | 7/1999 | Cho | 348/665 |
| 5,990,978 A | * | 11/1999 | Kim et al. | 348/663 |
| 6,774,954 B1 | * | 8/2004 | Lee | 348/665 |
| 6,914,638 B2 | * | 7/2005 | Tsui | 348/663 |
| 7,304,688 B1 | * | 12/2007 | Woodall | 348/663 |
| 7,336,321 B2 | * | 2/2008 | Suzuki et al. | 348/663 |
| 7,420,624 B2 | * | 9/2008 | Lin et al. | 348/663 |
| 7,432,987 B2 | * | 10/2008 | Shan et al. | 348/667 |
| 2004/0189875 A1 | * | 9/2004 | Zhai et al. | 348/669 |
| 2007/0153127 A1 | * | 7/2007 | MacInnis et al. | 348/667 |

\* cited by examiner

*Primary Examiner*—Brian P Yenke
(74) *Attorney, Agent, or Firm*—patenttm.us

(57) ABSTRACT

The present invention uses a 2D comb filter 20 to output a 2D chrominance signal C2d by comparing the current scan-line signals with the signals before and after the current scan-line signals. A 3D chrominance signal C3d is then acquired by directly subtracting two adjacent 2D image signals and then dividing by 2 to get an approximate chrominance signal C3d of the two 2D images. Ratio mixing is performed on the 2D chrominance signal C2d and the 3D chrominance signal C3d to output a near-actual chrominance signal. A chrominance variation value can be acquired by comparing the chrominance signals of the two adjacent images. Finally, an actual luminance signal of the current scan-line is separated by deducting the near-actual chrominance signal from the signals of the current scan-line to restore the luminance signal.

9 Claims, 3 Drawing Sheets

CPfade:3D
*MIXTURE RATIO*

W2D:2D
*MIXTURE RATIO*

US 7,545,442 B2

Y/C SEPARATION WITH 3D COMB FILTER

BACKGROUND OF THE INVENTION

1. Field of the Invention

The invention relates in general to a Y/C separation with 3D comb filter, and more particularly to a 3D image separation technique to separate Y/C signals of video signals to make chrominance signals of high frequency image signals close to actual chrominance to avoid a missing color problem.

2. Description of the Related Art

A conventional 2D comb filter separates chrominance (color) from luminance (brightness) information in a video signal for independent processing to improve picture resolution and minimize distortion. A 2D comb filter only performs operations on demodulated signals and adjacent horizontal scan-line signals. However, a 2D comb filter may generate errors or tend to be complex in line layout. Moreover, when a 2D comb filter processes high frequency video signals, since the luminance of the previous scan line and the current scan line changes very rapidly, an erroneous judgment may occur, so as to cause a missing color problem.

SUMMARY OF THE INVENTION

The present invention uses a 2D comb filter to output a 2D chrominance signal by comparing the current scan-line signals with the signals before and after the current scan-line signals. Then a 3D chrominance signal is acquired by directly subtracting two adjacent 2D image signals and then dividing by 2 to get an approximate 3D chrominance signal of the two 2D images. A ratio mixing is performed on the 2D chrominance signal and the 3D chrominance signal to output a near-actual chrominance signal. A chrominance variation value can be acquired by comparing the chrominance signals of the two adjacent images. Hence the present invention can control the mixture ratio value of the CPfade factor of the first dimension and the third dimension chrominance signals in accordance with the chrominance variation, so that the second dimension chrominance signals can be accurately adjusted, which is applied particularly to high frequency image signals. Therefore the present invention can improve the missing color image output problem without setting an extra mixture ratio value.

DETAILED DESCRIPTION OF THE INVENTION

Figure 1:
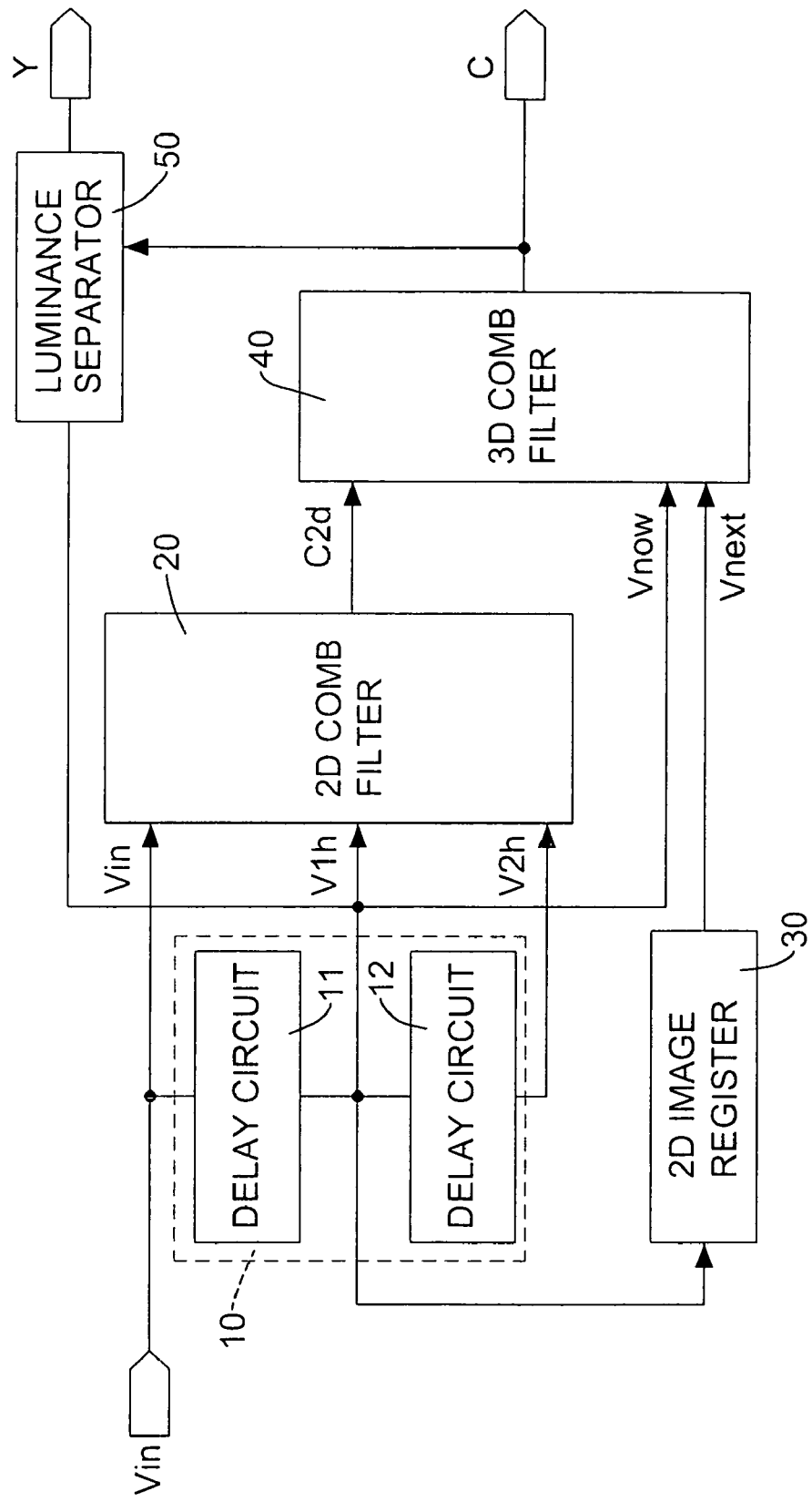
FIG. 1 shows a functional block diagram of the present invention.

A Y/C separation circuit of a three-dimension (hereafter abbreviated as 3D) image signal of the present invention is provided. With reference to FIG. 1, a functional block diagram of the present invention includes a delay unit 10, a 2D comb filter 20, a 2D image register 30, a 3D comb filter 40 and a luminance separator 50.

The delay unit 10 includes two delay circuits 11 and 12. The two delay circuits 11, 12 are series connected to an image signal input terminal Vin for simultaneous outputting of a current image scan signal Vin and two scan signals V1$h$ and V2$h$, which occur before and after the current scan signal Vin, respectively, so as to have three scan signals. Between the two delay circuits 11, 12 is the image scan signal V1$h$, which will undergo chrominance separation.

Every input terminal of the 2D comb filter 20 is connected respectively to the image signal input terminal and output terminals of the delay unit 10 to receive the three adjacent scan signals Vin, V1$h$, V2$h$. The 2D comb filter 20 converts and outputs a 2D chrominance signal C2$d$ using an internal vertical-correlation calculation circuit, a signal hybrid circuit, and a horizontal adjustment circuit.

The 2D image register 30 is connected to the output terminal of the first delay circuit 11 of the delay unit 10 to temporary store the 2D image signal of the previous image frame. Hence the 2D image register 30 is a delay circuit to delay the whole image frame.

Every input terminal of the 3D comb filter 40 is connected respectively to an output terminal of the 2D comb filter 20, an output terminal of the 2D image register 30, and the output terminal of the first delay circuit 11. The 3D comb filter 40 receives a current 2D image signal Vnow and the previous 2D image signal Vnext, which are converted to a 3D chrominance signal (not shown in the diagram). The 3D chrominance signal is then dynamic ratio mixed with the 2D chrominance signal C2$d$ of the 2D comb filter 20 to output a near-actual chrominance signal C. The dynamic mix ratio is gained by band-pass filtering, color demodulating and UV plane analysis. The near-actual chrominance signal C can reflect an actual chrominance value of a high-frequency image signal.

The luminance separator 50 is connected to the output terminal of the first delay circuit 11 and a chrominance signal output terminal of the 3D comb filter 40. The luminance separator 50 deducts the actual chrominance signal C from the scan signal Vin, which includes current luminance and chrominance, to get an actual luminance signal Y. The luminance separator 50 can be a subtractor.

Figure 2:
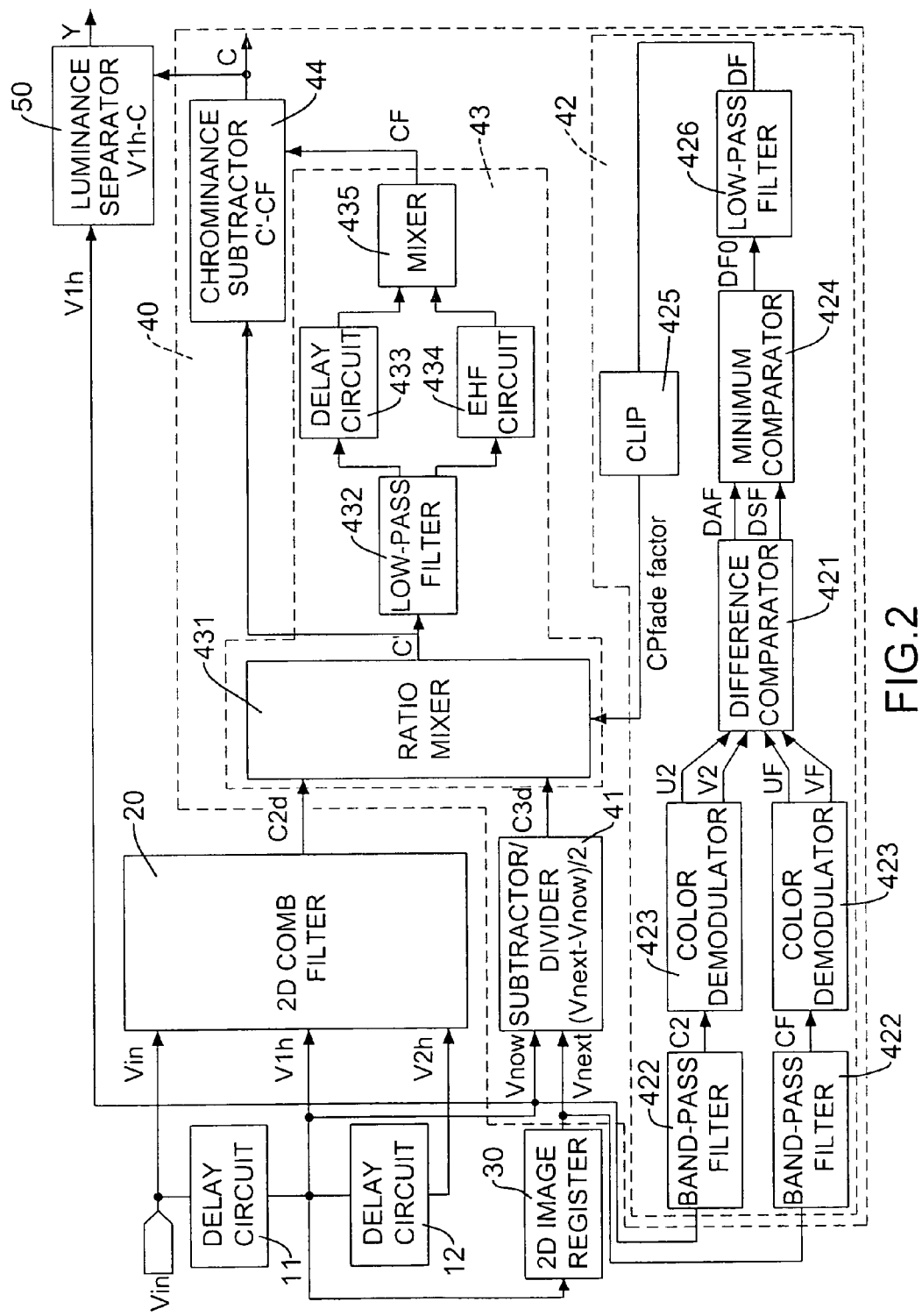
FIG. 2 shows a detailed functional block diagram of a part of the present invention.

With reference to FIG. 2, a detailed functional block diagram of the 3D comb filter 40 includes a first 2D image chrominance capture unit 41, a second 2D image chrominance capture unit 42, a 3D image chrominance capture unit 43, and a chrominance subtractor 44.

The first 2D image chrominance capture unit 41 includes a subtractor/divider, which operates to directly subtract two adjacent 2D image signals and then dividing by 2 to get an approximate chrominance signal C3$d$ of the two 2D images.

The second 2D image chrominance capture unit 42 includes a difference comparator 421, a minimum comparator 424 and a clip 425.

The difference comparator 421 executes a difference comparison between the current 2D image signal Vnow and the previous 2D image signal Vnext that Vnow is processed by a band-pass filter 422 and a color demodulator 423 to get a chrominance value and to extend to a coordinated plane signal.

Figure 3:
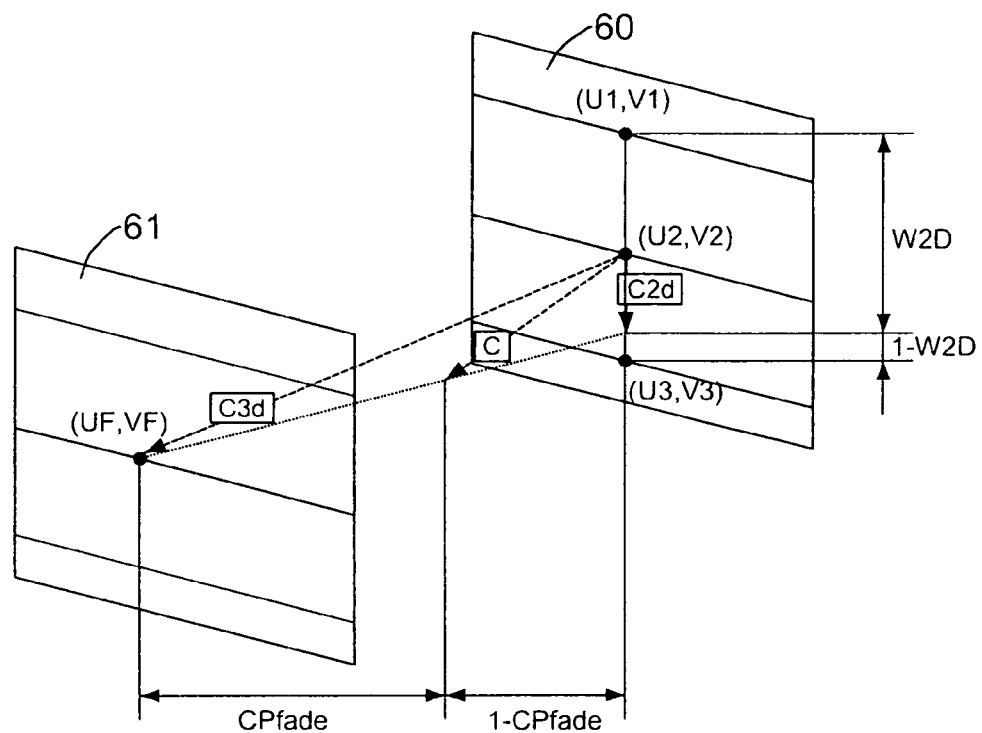
FIG. 3 shows an UV coordinate diagram of the present invention.

The minimum comparator 424 is connected to an output terminal of the difference comparator 421 to calculate the difference value of the image signals of the same scan-lines (U2,V2), (UF,VF) of the two adjacent 2D images 60,61, which is as shown in FIG. 3.

The clip 425 is connected to an output terminal of the minimum comparator 424 through a low-pass filter 426 to get the outputted difference value of the minimum comparator

424 to provide a mixture ratio value of a CPfade factor depending on the difference value.

The 3D image chrominance capture unit 43 includes a ratio mixer 431 and a horizontal adjustment circuit (not shown in the diagram).

The input terminals of the ratio mixer 431 are connected respectively to an output terminal of the 2D comb filter 20, an output terminal of the first 2D image chrominance capture unit 41 to receive the 2D chrominance signal C2$d$ and the 3D chrominance signal C3$d$. The ratio mixer 431 is also connected to an output terminal of the clip 425, so as to compare the chrominance of the current scan signal and the adjacent front and rear scan signals with those at the same positions of the previous image signals. And, in coordination with the mixture ratio value outputted by the second 2D image chrominance capture unit 42, outputs a near-actual chrominance signal of a third chrominance signal C'.

The horizontal adjustment circuit (not shown in the diagram) includes a low-pass filter 432, a third delay circuit 433, an extremely high frequency (EHF) circuit 434 and a mixer 435. The low-pass filter 432 is connected to the third chrominance signal output terminal of the ratio mixer 431 to make a carrier frequency of the third chrominance signal C' filtered to extract the luminance signal Y, which then to goes through the third delay circuit 433, the extremely high frequency circuit 434 and the mixer 435 to be output as a remnant luminance signal CF of a C signal.

The chrominance subtractor 44 is connected to a mixer 435 of the horizontal adjustment circuit and the chrominance signal output terminal of the ratio mixer 431 to mix the chrominance signal before and after horizontal adjustment together to output a final chrominance signal C.

The final chrominance signal C is outputted to the luminance separator 50. The other terminal of the luminance separator 50 is connected to the output terminal of the first delay circuit 11 to receive the current scan signal Vin. Since the current scan signal Vin includes the luminance signal Y and the chrominance signal C, the luminance signal Y can be successful acquired by using the luminance separator 50 and the chrominance subtractor 44 to precisely get the chrominance signal C of the current image signal.

With reference to FIG. 3, a chrominance deviation of the actual 2D chrominance signals and the 3D chrominance signals of the present invention is shown.

Figure 4:
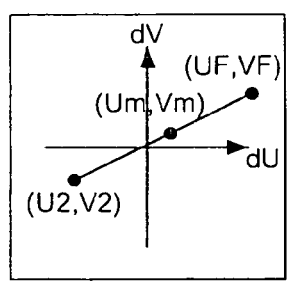
FIG. 4A shows an operation diagram of a 2D chrominance signal of the present invention.
FIG. 4B shows an operation diagram of a 3D chrominance signal of the present invention.
Figure 4:
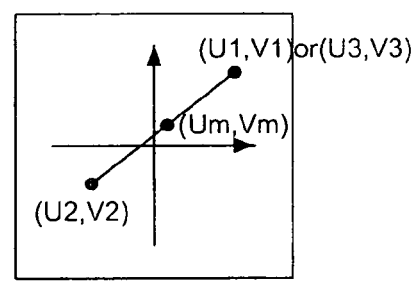

Firstly, the present invention performs a 2D chrominance signal operation on three adjacent scan-lines (U1,V1), (U2,V2) and (U3,V3). With simultaneous reference to FIG. 4A, the aforesaid operation uses a vertical-correlation calculation circuit to get a mixture ratio W2D. If the current scan-line of the image signal is (U2,V2), having the luminance signal deviated to the chrominance signal of the latter scan-line (U3,V3), this state will reflect to the 2D chrominance mixture ratio W2D.

The 2D chrominance signal C2$d$ deviated to the latter scan-line then can be gained in accordance with the 2D chrominance mixture ratio W2D to mix the chrominance signals of the previous and the latter scan-line signals. Then a 3D chrominance signal operation is further performed on the 2D chrominance signal C2$d$ and the same scan-line (UF,VF) of the previous image. With simultaneous reference to FIG. 4B, a rough 3D chrominance signal C3$d$ is obtained first, and then a 3D chrominance mixture ratio CPfade is acquired by band-pass filtering and difference comparing of the vertical correlation operation with the before and after scan-lines (UF,VF) (U2,V2) at the same position.

Hence the present invention mixes the rough 3D chrominance signal C3$d$ with the 2D chrominance signal C2$d$ in accordance with the 3D chrominance mixture ratio CPfade and uses the horizontal adjustment circuit to get a near-actual chrominance signal C. In this way, the present invention can effectively improve the missing color issue of the 2D chrominance operation.

Therefore, it can be understood from the above description that the Y/C separation with a three-dimension (hereafter abbreviated as 3D) comb filter includes the steps as follows:

First, a 2D chrominance signal is acquired. The 2D chrominance signal is formed by separating multiple chrominance signals of every scan-line in a same image frame, band-pass filtering every scan line and every two adjacent scan-lines, color demodulating, difference comparing to get a minimum value and mixing by a ratio.

Second, a 3D chrominance signal is acquired and a chrominance variation value is calculated. The 3D chrominance signal and the chrominance variation value are formed by separating multiple chrominance signals of the scan-lines at the same positions of two adjacent image frames, band-pass filtering, color demodulating, and difference comparing to get a minimum value and the chrominance variation value of the same positions of the two adjacent image frames.

Third, an actual chrominance signal of the current scan-line is resolved by taking the chrominance variation value as a mixture ratio value to perform ratio mixing on the 2D chrominance signal and the 3D chrominance signal to output a near-actual chrominance signal.

Fourth, an actual luminance signal of the current scan-line is separated by deducting the near-actual chrominance signal from the signals of the current scan-line to restore the luminance signal.

In conclusion, the present invention uses the 2D comb filter 20 to output the 2D chrominance signal C2$d$ by comparing the current scan-line signals with the signals before and after the current scan-line signals. The 3D chrominance signal C3$d$ is acquired by directly subtracting two adjacent 2D image signals and then dividing by 2 to get an approximate chrominance signal C3$d$ of the two 2D images. A ratio mixing is performed on the 2D chrominance signal C2$d$ and the 3D chrominance signal C3$d$ to output a near-actual chrominance signal. The chrominance variation value can be acquired by comparing the chrominance signals of the two adjacent images. Hence the present invention can control the mixture ratio value of the CPfade factor of the first dimension and the third dimension chrominance signals in accordance with the chrominance variation, so that the second dimension chrominance signals can be adjusted to be accurate, which is applied particularly to high frequency image signals. Therefore the present invention can mitigate the missing color image output problem without setting an extra mixture ratio value.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A Y/C separation with a three-dimension comb filter comprising:

acquiring a two-dimension chrominance signal, which is formed by separating a plurality of chrominance signals of every scan-line in a same image frame, band-pass filtering every scan line and every two adjacent scan-lines, color demodulating, difference comparing to get a minimum value and to mix by a ratio;

acquiring a 3D chrominance signal and calculating a chrominance variation value, which are formed by separating a plurality of chrominance signals of the scan-lines at the same positions of two adjacent image frames, band-pass filtering, color demodulating, and difference comparing to get a minimum value and the chrominance variation value of the same positions of the two adjacent image frames;

resolving an actual chrominance signal of the current scan-line by taking the chrominance variation value as a mixture ratio value to perform ratio mixing on the 2D chrominance signal and the 3D chrominance signal to output a near-actual chrominance signal; and separating an actual luminance signal of the current scan-line by deducting the near-actual chrominance signal from a plurality of signals of the current scan-line to restore the luminance signal.

2. A Y/C separation with 3D comb filter as claimed in claim 1 comprising:

a delay unit comprising two delay circuits, wherein the two delay circuits are series connected to an image signal input terminal for simultaneously outputting a current image scan signal and two scan signals, which occur before and after the current scan signal, respectively;

a 2D comb filter, wherein every input terminal is connected respectively to the image signal input terminal and output terminals of the delay unit to receive the three adjacent scan signals, and to convert and output a 2D chrominance signal;

a 2D image register connected to the output terminal of the first delay circuit of the delay unit to temporarily store the 2D image signal of the previous image frame;

a 3D comb filter, wherein every input terminal is connected respectively to an output terminal of the 2D comb filter, an output terminal of the 2D image register, and the output terminal of the first delay circuit to receive a current 2D image signal and the previous 2D image signal to be converted to a 3D chrominance signal, and then to be dynamic ratio mixed with the 2D chrominance signal of the 2D comb filter to output a near-actual chrominance signal, wherein the near-actual chrominance signal can reflect an actual chrominance value of a high-frequency image signal; and a luminance separator connected to the output terminal of the first delay circuit and a chrominance signal output terminal of the 3D comb filter to deduct the chrominance signal from the scan signal, which includes current luminance and chrominance, to get a luminance signal.

3. The Y/C separation with 3D comb filter as claimed in claim 2, wherein the 3D comb filter comprises:

a first 2D image chrominance capture unit comprising a subtractor/divider, which operates to directly subtract two adjacent 2D image signals and then divided by 2 to get an approximate chrominance signal value of the two 2D images;

a second 2D image chrominance capture unit comprising a difference comparator, a minimum comparator and a clip;

a 3D image chrominance capture unit comprising a ratio mixer and a horizontal adjustment circuit;

a chrominance subtractor connected to a mixer of the horizontal adjustment circuit and an chrominance signal output terminal of the ratio mixer to mix the chrominance signal, before and after horizontal adjustment, to output a final chrominance signal.

4. The Y/C separation with 3D comb filter as claimed in claim 3, wherein two input terminals of the difference comparator are connected respectively to the output terminals of the first delay circuit with a band-pass filter and a color demodulator and further connected to the output terminal of the 2D image register to get the current 2D image signal and the previous 2D image signal.

5. The Y/C separation with 3D comb filter as claimed in claim 4, wherein the minimum comparator is connected to an output terminal of the difference comparator to calculate the difference value of the image signals of the same positions of the two adjacent 2D images.

6. The Y/C separation with 3D comb filter as claimed in claim 5, wherein the clip is connected to an output terminal of the minimum comparator by a low-pass filter to get the outputted difference value of the minimum comparator to provide a mixture ratio value depending on the difference value.

7. The Y/C separation with 3D comb filter as claimed in claim 6, wherein the input terminals of the ratio mixer are respectively connected to an output terminal of the 2D comb filter, an output terminal of the first 2D image chrominance capture unit and an output terminal of the clip of the second 2D image chrominance capture unit to compare the chrominance of the current scan signal and the adjacent front and rear scan signals with those at the same positions of the previous image signals to operate in coordination with the mixture ratio value outputted by the second 2D image chrominance capture unit to further output a near-actual chrominance signal.

8. The Y/C separation with 3D comb filter as claimed in claim 7, wherein the horizontal adjustment circuit comprises a low-pass filter, a third delay circuit, a extremely high frequency (EHF) circuit and a mixer, wherein the low-pass filter is connected to the chrominance signal output terminal of the ratio mixer to make a carrier frequency of the chrominance signal filtered to extract the luminance signal, and then to go through the third delay circuit, the extremely high frequency circuit and the mixer to output a remnant luminance signal of a C signal.

9. The Y/C separation with 3D comb filter as claimed in claim 2, wherein the luminance separator can be a subtractor.

* * * * *